United States Patent
Anderson

(10) Patent No.: US 12,540,640 B2
(45) Date of Patent: Feb. 3, 2026

(54) THREADED FASTENER AND CONNECTOR

(71) Applicant: Rick Anderson, Minneapolis, MN (US)

(72) Inventor: Rick Anderson, Minneapolis, MN (US)

(73) Assignee: Process Displays LLC, Minneapolis, MN (US)

( * ) Notice: Subject to any disclaimer, the term of this patent is extended or adjusted under 35 U.S.C. 154(b) by 330 days.

(21) Appl. No.: 17/685,581

(22) Filed: Mar. 3, 2022

(65) Prior Publication Data

US 2022/0403869 A1  Dec. 22, 2022

Related U.S. Application Data

(60) Provisional application No. 63/156,019, filed on Mar. 3, 2021.

(51) Int. Cl.
*F16B 35/00* (2006.01)
*F16B 37/16* (2006.01)

(52) U.S. Cl.
CPC .............. *F16B 35/00* (2013.01); *F16B 37/16* (2013.01)

(58) Field of Classification Search
CPC ...... F16B 35/00; F16B 33/02; F16B 25/0047; F16B 25/0052; F16B 25/0042
USPC .............................. 411/423, 411, 416, 387.4
See application file for complete search history.

(56) References Cited

U.S. PATENT DOCUMENTS

| | | | | |
|---|---|---|---|---|
| 2,177,005 A * | 10/1939 | Purtell | .................... | F16B 39/30 411/311 |
| 3,982,575 A * | 9/1976 | Ollis, Jr. | ................. | F16B 39/30 411/386 |
| 4,403,895 A * | 9/1983 | Caldwell | ................. | F16B 35/04 411/908 |
| 4,923,161 A * | 5/1990 | Fahringer | ............. | A47F 5/0823 248/222.13 |
| 5,863,165 A * | 1/1999 | Schulte | ............... | F16B 25/0052 411/386 |
| 6,827,538 B2 * | 12/2004 | Doppke | ................... | F16B 39/30 411/311 |
| 7,785,055 B2 * | 8/2010 | Dicke | ................. | F16B 25/0047 411/386 |
| 8,038,376 B2 * | 10/2011 | Jung | ....................... | F16B 39/30 411/308 |
| 8,511,960 B1 * | 8/2013 | Folk | ........................ | F16B 33/02 411/436 |
| 8,616,091 B2 * | 12/2013 | Anderson | .............. | B43M 15/00 81/52 |
| 9,347,477 B2 * | 5/2016 | Anderson | ............... | F16B 21/02 |
| 11,391,313 B2 * | 7/2022 | Hubmann | ........... | F16B 25/0047 |
| 2006/0127199 A1 * | 6/2006 | Bappert | ............... | F16B 13/002 411/411 |
| 2012/0063865 A1 * | 3/2012 | Huang | ................ | F16B 25/0047 411/393 |

\* cited by examiner

*Primary Examiner* — Flemming Saether
(74) *Attorney, Agent, or Firm* — Daniel A. Rosenberg; Taft Stettinius & Hollister LLP

(57) ABSTRACT

A screw includes a head having and a stem with spaced apart threads. The thread of the thread of the screw includes flat spots and sloped section, and is sized, such that it can securing attach through a hole in the pegboard without damaging the hole despite the thread being wider than the hole.

9 Claims, 19 Drawing Sheets

ISOMETRIC VIEW

TOP VIEW

FRONT VIEW

RH SIDE VIEW

ISOMETRIC VIEW

TOP VIEW

FRONT VIEW

RH SIDE VIEW

ISOMETRIC VIEW

TOP VIEW

TOP VIEW

ISOMETRIC VIEW

FRONT VIEW
SCALE 2 : 1

RH SIDE VIEW

THREADED FASTENER AND CONNECTOR

RELATED APPLICATIONS

The present application claims priority to and incorporates by reference U.S. Provisional Application No. 63/156,019, filed Mar. 3, 2021.

BACKGROUND OF THE INVENTION

Field of the Invention

This invention relates to a multiple use threaded fastener, or screw. In particular, the invention relates to a reusable fastener designed to secure to various surfaces and to connect various items thereto, including for use with pegboard and display materials such as promotional posters, displays, and brackets attached to pegboard, most preferably in a retail environment. Of course, a person of ordinary skill in the art will understand that the invention is not necessarily so limited.

Background

In many environments material is commonly affixed to open wall space, an in particular in retail environments promotional and marketing displays are used with various goods. Conventionally, these materials, which can include posters, displays, products, brackets, hardware, or other materials, are affixed to a backing adapted for repeated display and removal of the items.

A common type of backing is referred to as a pegboard gondola (see FIG. 1), which consists of a durable material with a pattern of perforations located in a predetermined pattern fixed to a footing and used for display and product shelving. Connectors, fasteners, or brackets are designed to attach to the pegboard in a secure and releasable manner. Also, due to the fact that these displays are frequently changed the connectors and fasteners must be capable of removal to allow for such updates.

A variety of prior art connectors exist. These include a device having a generally flat head connected to an extended body that is sized to be captured in the spaced apart holes of the pegboard. If display material is attached to the gondola, then the connectors pass through holes in the material to be displayed and then the connectors fasten into the pegboard and thereby provide a reasonably stable mounting mechanism. Such connectors include so called "canoe clips." The head of the clip is flat without any indentations or grooves for removal. In fact, the clips do not include any particular structural elements to allow for removal. When the display is replaced the clips are pulled or pried out of place, normally in a destructive manner, thrown away and new clips are used for the next display. In this manner the clips are disposable and not suitable for reuse, and can damage the holes they are inserted into.

Another such device is the "Christmas tree clip." These clips also contain a head and body, however, in this case the body includes a plurality of teeth circularly disposed around the axis of the body, each tooth comprised of a circumferential flange angled to resist removal after insertion. Again, the clips do not include any convenient means for removal, and are therefore designed for one-time disposable use, and can damage the holes when removed.

While these prior art clips are generally inexpensive plastic articles, ultimately the cost of continued replacement of used clips becomes very significant. Furthermore, the environmental impact of disposable clips is detrimental. Additionally, because these clips are not designed to be removed easily, over time they damage the pegboard requiring further costs and expense.

Another use of such clips is to assemble displays, and in particular assembly of cardboard or corrugated display material. One such prior art device is known as the "Viking clip," which is comprised of plastic and consists of a flathead screw with a nut or wing nut that affixes to the threaded body of the screw. The threads are minimal, and have a diameter less than the diameter of the hole. The Viking clip, however, requires manipulation from both sides of the assembly since the nut must be placed on the screw after the screw is placed through the hole in the assembly. Frequently, given the size of the assemblies, this requires two people to perform the assembly—one in the front and one in the back to affix the nut.

Conventional threaded screws are not suitable for these purposes, especially with pegboard gondolas. Screws secure by embedding the edge of the threads into the side of the holes. Screws of this type cannot be used with pegboard gondolas because repeated removal and insertion of a screw will destroy the holes making them unable to retain the screw, and eventually require replacing the gondola as more and more holes are destroyed. Thus, while screws are very effective fasteners they heretofore have not been suitable for use with pegboard displays like gondolas.

Accordingly, a need exists for a fastener or clip that overcomes the difficulties of the prior art.

DETAILED DESCRIPTION OF THE PREFERRED EMBODIMENTS

Figure 2:
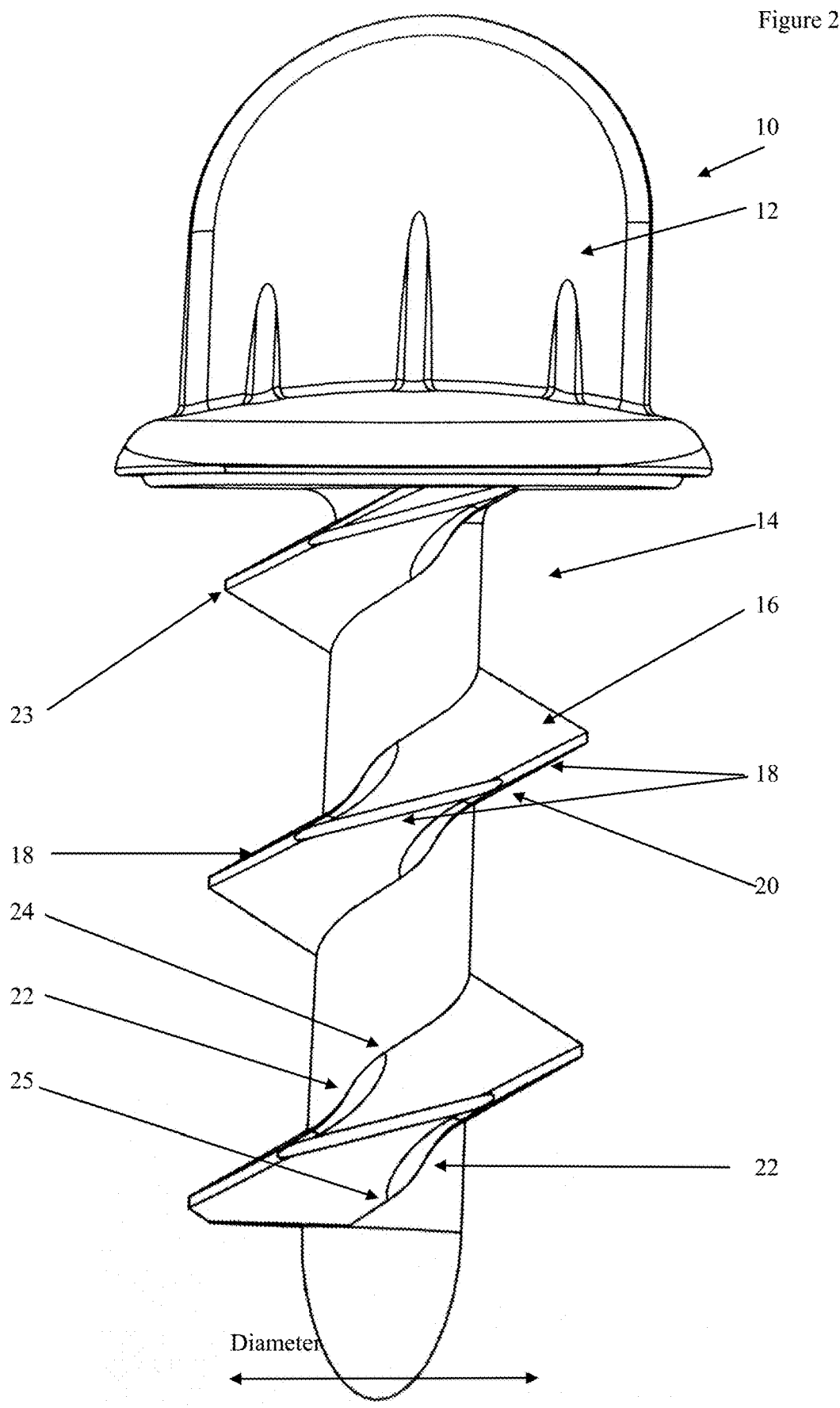
FIG. 2 is a view of a screw of the present invention.
Figure 3:
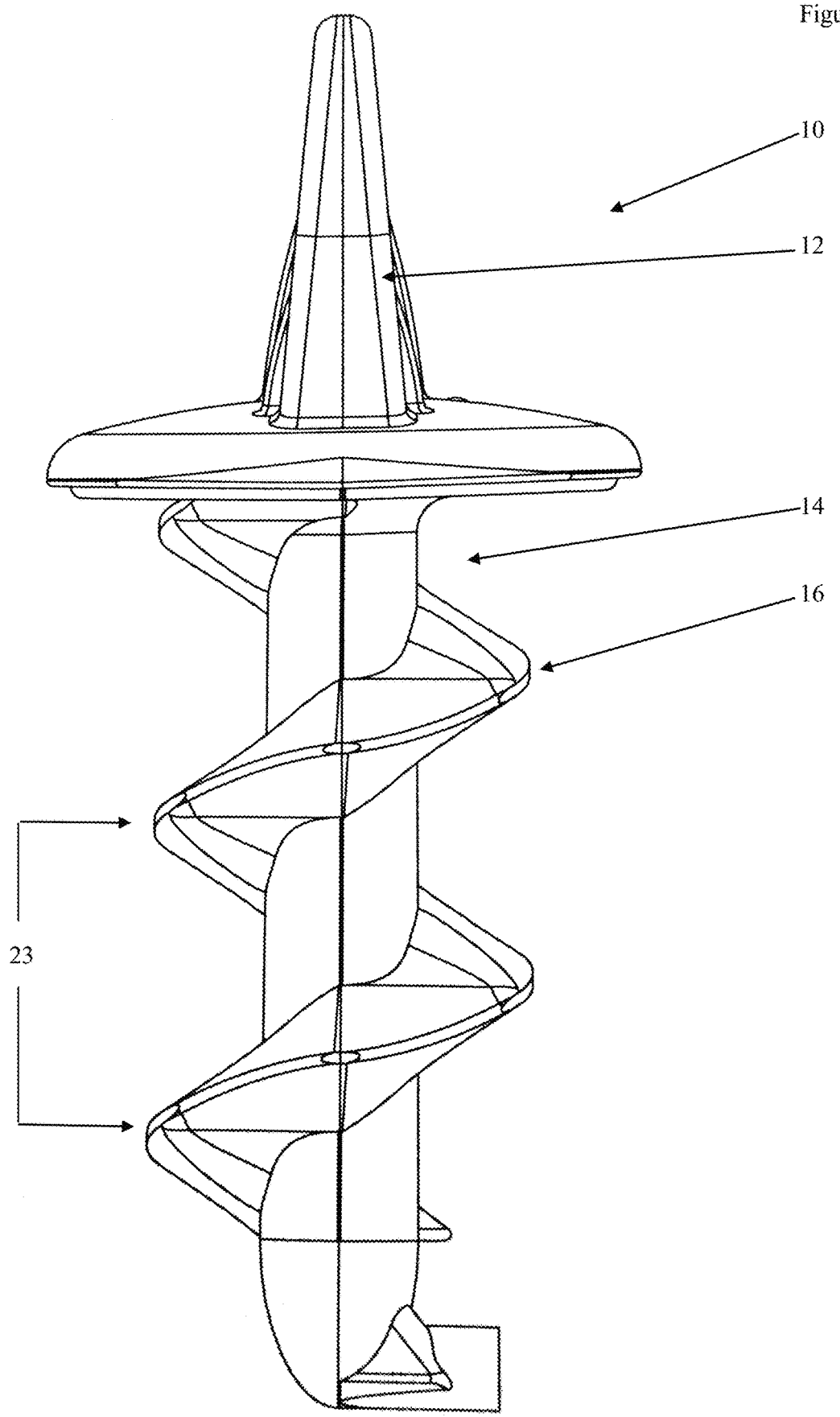
FIG. 3 is a view of the screw of FIG. 2 rotated 90° clockwise.

In the Figures, various configurations of a screw 10 are shown. The screw 10 includes a head 12 of various types and a stem 14 having spaced apart threads 16. FIG. 2 shows a first view of the screw 10. FIG. 3 shows a side view of the screw 10, where the screw 10 is rotated 90° clockwise from the position of the clip 10 in FIG. 2.

The threads 16 of the clip 10 have a number of unique features. Each complete turn of the threads 16 includes three flat edges 18. The flat edges 18 are shown in FIG. 2. The flat edges 18 have peaks 20 between and at the ends of the flat edges 18. The flat edges 18 follow the general contour of a conventional curved thread, but instead of a continuous curved edge to the thread 16 the edge is comprised of discrete flat segments. The three flat edges 18 for each turn of the thread 16 are located generally on one side of the screw 10, the other side of the screw 10 (see FIG. 3) shows the thread 16 with a conventional curved edge.

The thread 16 has a diameter, measured along the line marked "Diameter" displayed in FIG. 2 (the line is included to show the direction of the diameter, and is not meant to represent the actual diameter). The actual diameter of the thread will vary depending if the diameter is measured from a flat edge 18 or peak 20—the diameter measured from a flat edge 18 is less than the diameter measured from the peak 20.

The threads 16 of the screw 10 also include sloped sections 22, above and below the thread 16 (See FIG. 2). The sloped sections 22 are oriented on the stem 14 of the screw 10 so that an upper sloped section 22 has an end 24 that is directly above (vertically) an opposite end 25 of a lower sloped section 22. In this manner an upper and lower sloped sections 22 on a particular thread 16 are offset along a longitudinal axis of the thread 16. The ends of the sloped sections 22 opposite to the ends indicated at 24, 25 in FIG. 2, generally line up with the peaks 20 that form the ends of one flat section 18.

Figure 4:
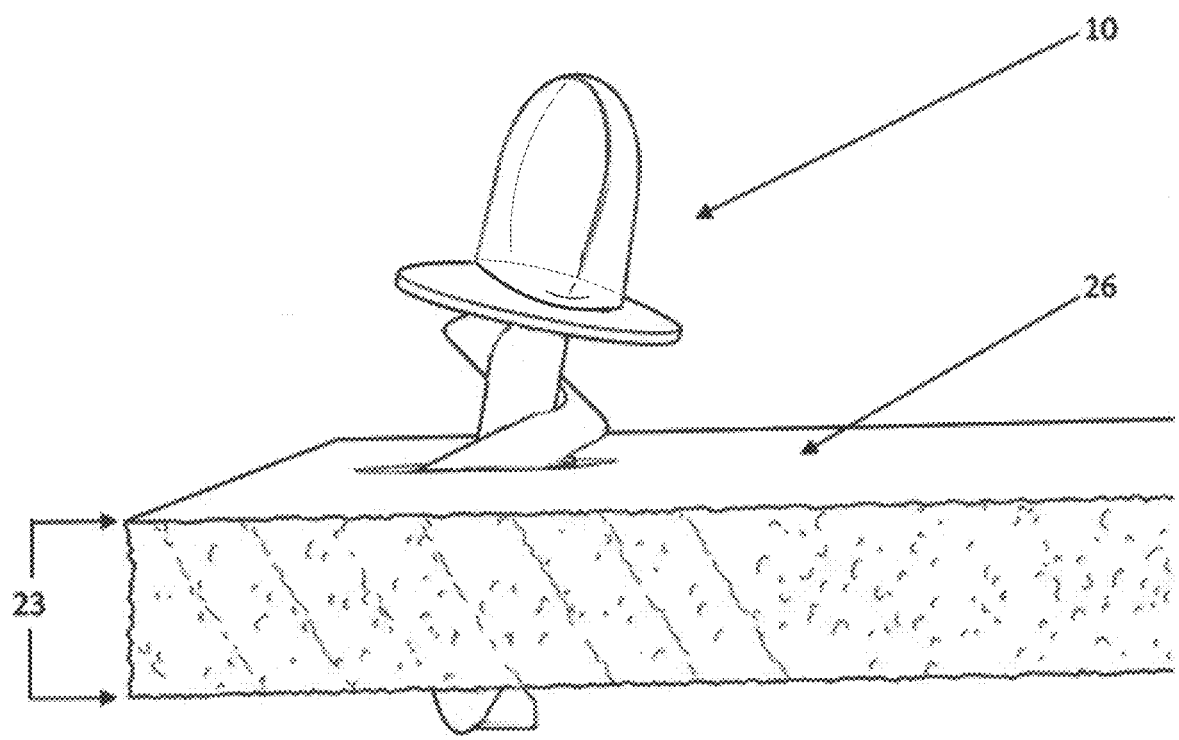
FIG. 4 is a side view of the screw inserted into a section of pegboard.

The screw 10 is most particular designed to be inserted into holes in pegboard 26. Even more particularly, the threads of the screw 10 are spaced such that the length 23 one complete turn of the thread 16 is substantially the same distance as the length 23 of the hole in the pegboard 26 (See numeric indicator 23 on FIGS. 3 and 4).

Figure 1:
FIG. 1 is a perspective view of a prior art gondola.

As mentioned the configuration of the screw 10 gives it a number of unique properties during operation. The screw 10 is used in combination with pegboard 26 of the type used on the gondola shown in FIG. 1, however, the invention is not necessarily limited thereto. The pegboard 26 includes a plurality of holes therein into which the screw 10 can be inserted and removed, without damage to the holes. This is accomplished despite the fact that the diameter of the threads 16 of the screw 10 is wider than the diameter of the hole in the pegboard 26 into which the screw 10 fits.

Normally, the diameter of a screw is wider than the hole it will be inserted into by design so that the threads will embed into the side of the hole securing the screw, however, in the case where the screw needs to be inserted and removed repeatedly into a relatively soft material such as pegboard this is not desirable. In particular, with a gondola this can destroy the pegboard and thereby the gondola.

The screw 10 cannot be inserted straight into the hole in the pegboard 26 without damaging the hole because the diameter of the threads 16 is wider than hole when the screw 10 is perpendicular to the plane pegboard 16. The screw 10 therefore enters the hole in the pegboard 26 at angle (see FIG. 4). Because the length 23 of one complete thread 16 along the stem 14 of the screw 10 is substantially the same as the length 23 of the hole, and because the flat edges 18 are generally on one side of the screw 10, the screw 10 threads into the hole at this angle. This allows the wider diameter of the threads 16 to be narrowed enough to fit into the hole.

In other words, as the screw 10 is threaded into the hole, and one complete thread 16 has entered the hole, the flat edge 18 of one thread 16 enters the hole as the flat edge 18 of the lower thread 16 begins to exit the hole—having a flat edge 18 always in the hole reduces the diameter of the thread 16. Also, as a lower sloped section 22 of one thread 16 enters the top of the hole the lower sloped section 22 of the adjacent thread leaves the hole at the bottom of the hole—also reducing the diameter of the thread 16. Because of the alignment of the sloped sections 22 along the base 14 (described above), the point at which one lower sloped section 22 enters the hole and the upper sloped section 22 of the adjacent thread 16 exits the hole is at a point where the middle of a flat edge 18 of one thread 16 enters the hole and the flat edge 18 of the adjacent thread 16 exits the hole. The combination of the flat edges 18 and the sloped sections 22 always in contact with the entry and exit point of the hole narrows the diameter of the thread 16 to fit in the hole of the pegboard 26. Inside the hole, a flat edge 18 is always in contact with the side of the hole, and a curved edge opposite thereto is in contact with the opposite side of the hole, again, presenting a reduced diameter of the thread 16 inside the hole.

Figure 5:
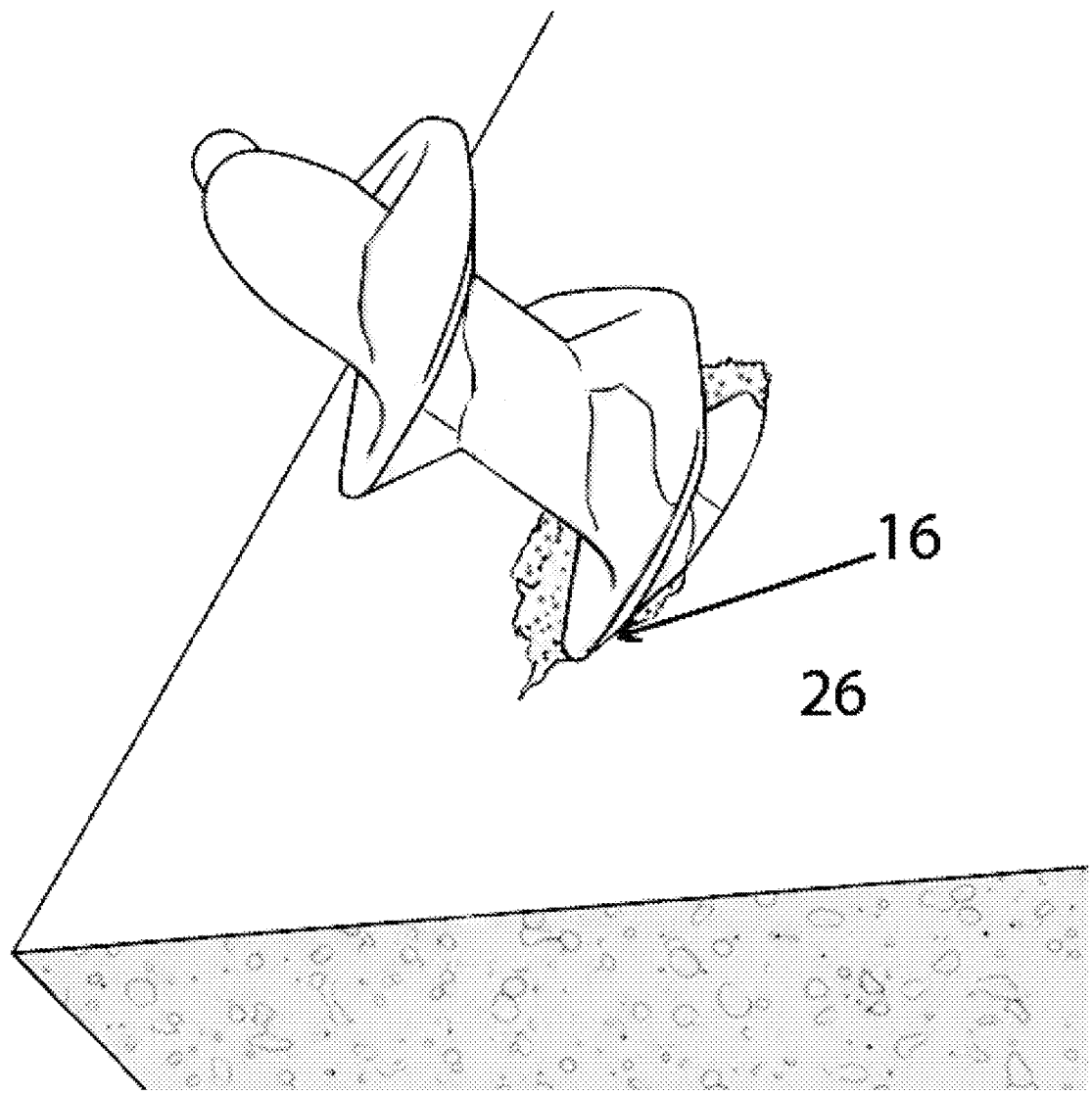
FIG. 5 is a perspective view of the screw inserted into the pegboard.

This continues until the screw 10 is completely inserted into the hole (see FIG. 5). As this happens, the bottom of the head 12 of the screw is pressed up against the top of the pegboard 26, which straightens out the screw 10. The peak 20 on the thread 16 that has just exited the bottom of the hole is driven over the edge of the lip on the bottom of the hole, and the upper part of the same portion of the topmost thread 16 (which is not sloped and so provides no relief from the diameter of the thread 16) forms a clamp that secures the screw 10 in the hole. The diameter between the peak 20 and the curved section 23 of the thread 16 immediately above the peak 20, represents the full diameter of the thread 16, which forces the peak 20 slightly out of the bottom of the hole and securely over the lip of the bottom of the hole—without damaging the inside of the hole because this tight full diameter fit only occurs at the end of insertion of the screw 10 and the pressure is relieved at the moment the screw 10 is withdrawn.

Figure 6:
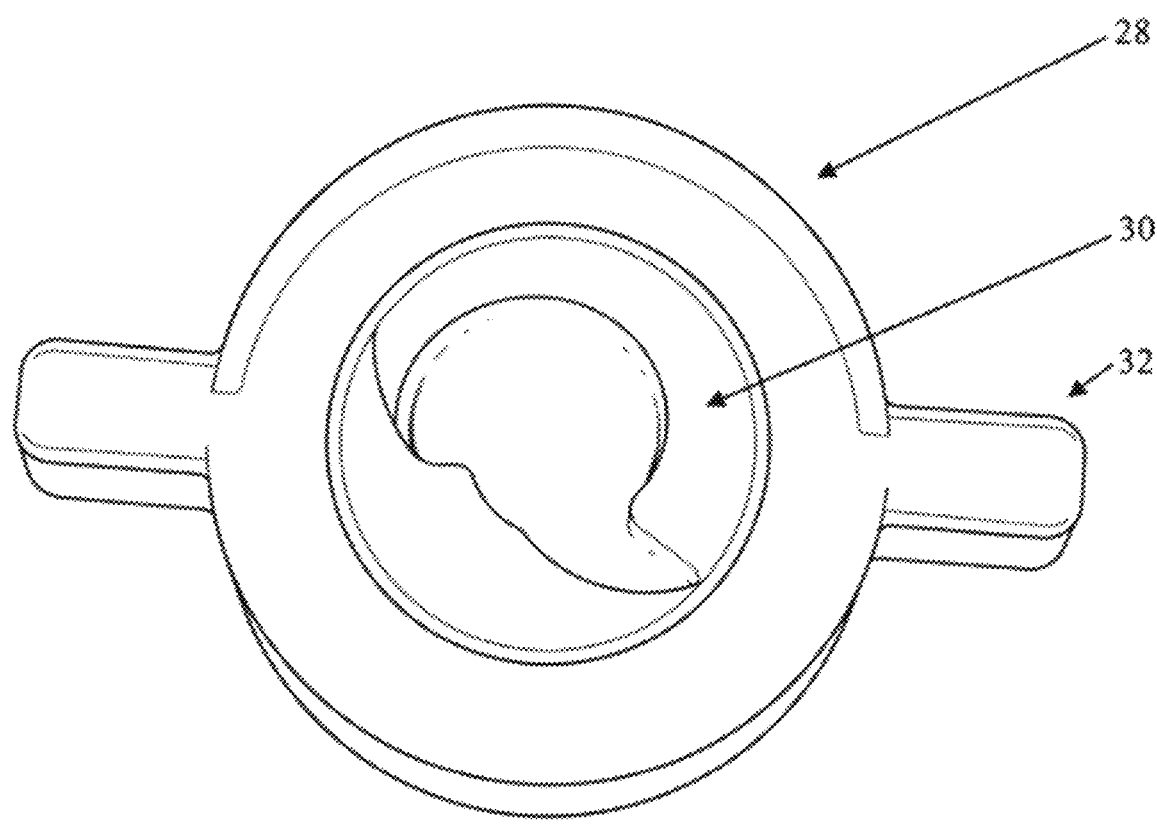
FIG. 6 is an end view of a nut.
Figure 7:
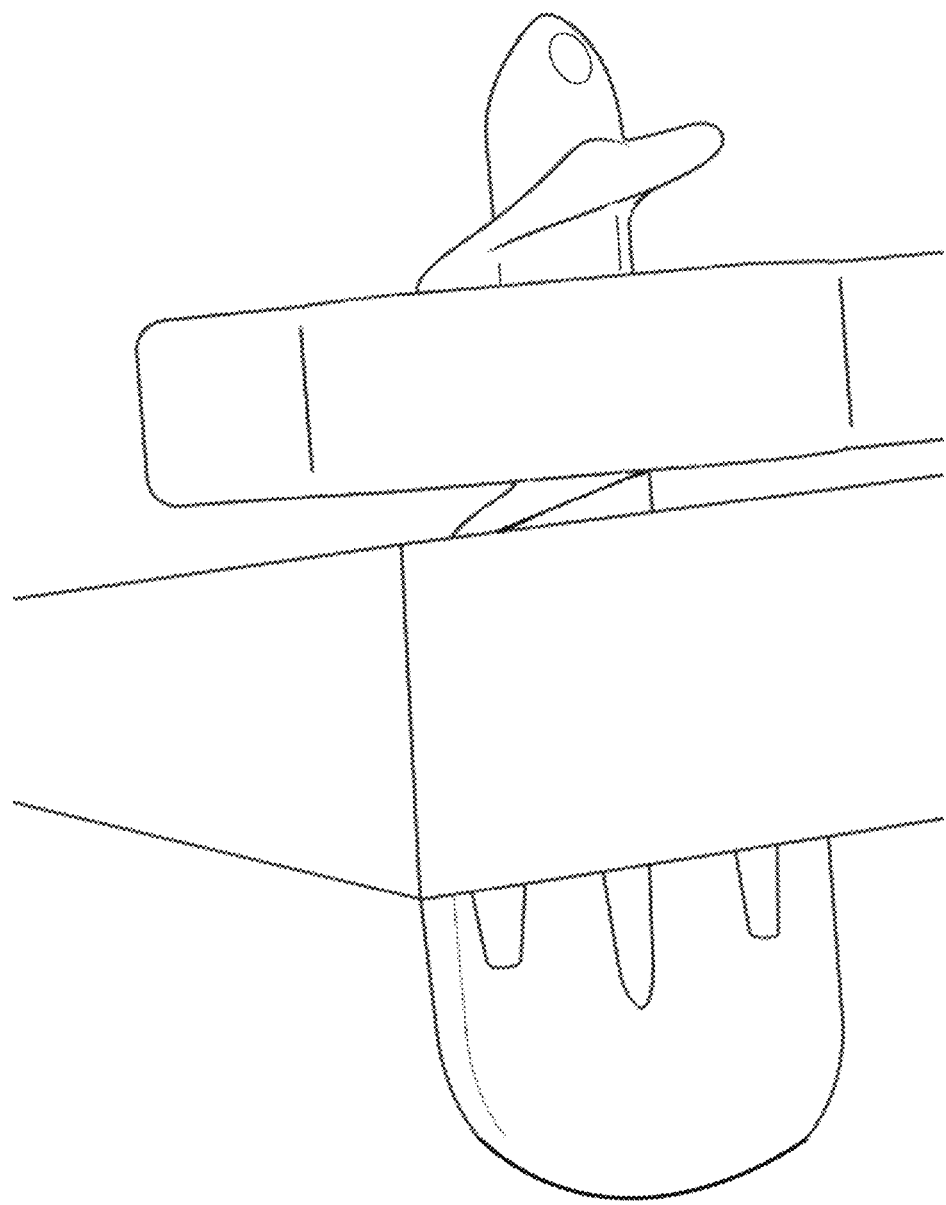
FIG. 7 is a side view of the nut threaded onto the screw.

FIGS. 6 and 7 shows a nut 28 for use with the screw 10. The nut 28 includes an internal thread 30, and two opposing grips 32. The nut 28 can be threaded onto the screw 10. For example, after the screw 10 has been secured to the pegboard 26, the nut 28 can be attached to provide additional securement, or to affix material between the pegboard 26 and the nut 28. The grips 32 provide a convenient means to affix or remove the nut 28.

The thread 32 of the nut 28 comprises slightly less than one complete turn of the thread 16. This allows the nut 28 to be produced with an open molding process, as opposed to a closed molding process. With open molding the molding material is open to the air and can cure quickly. If the thread 32 is much more than one full thread, then it cannot be produced using open molding and must be closed molded, which increases the cost and time necessary to produce the nut 32. The reduced size of the thread 32 of the nut 28 also assists in ease of manufacture if the nut 32 is produced through a metal stamping process.

The screw 10 is shown in the Figures with a thumb screw head 12, however, the head 12 can be of other types. The head 12 can be flat, or can include a standard or Phillips slot for use of a screwdriver, or can be shaped for use of an Allen or hex head wrench.

Figure 8:
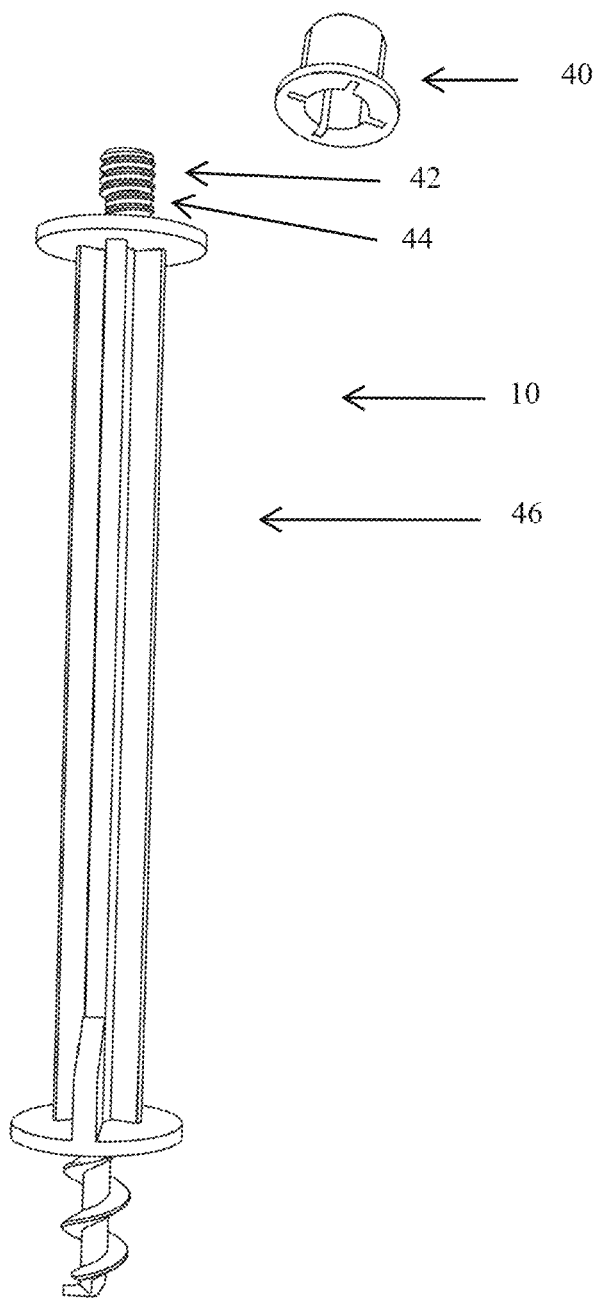
FIG. 8 is a view of a screw.
Figure 9:
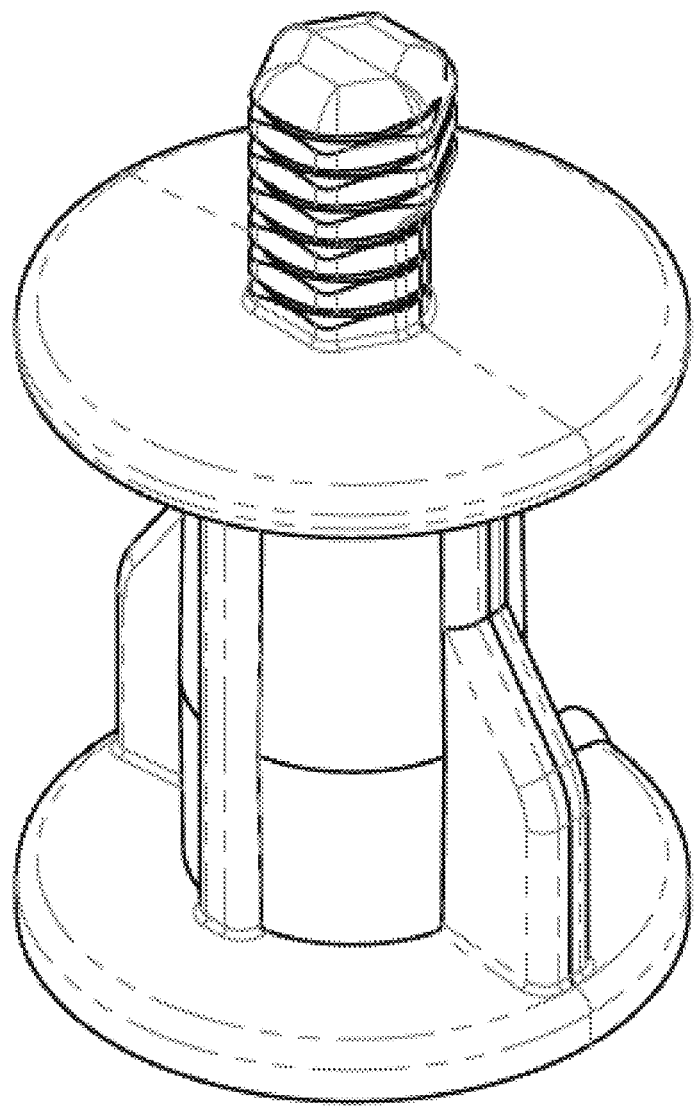
FIG. 9 is an isometric view of a negative standoff
Figure 10:
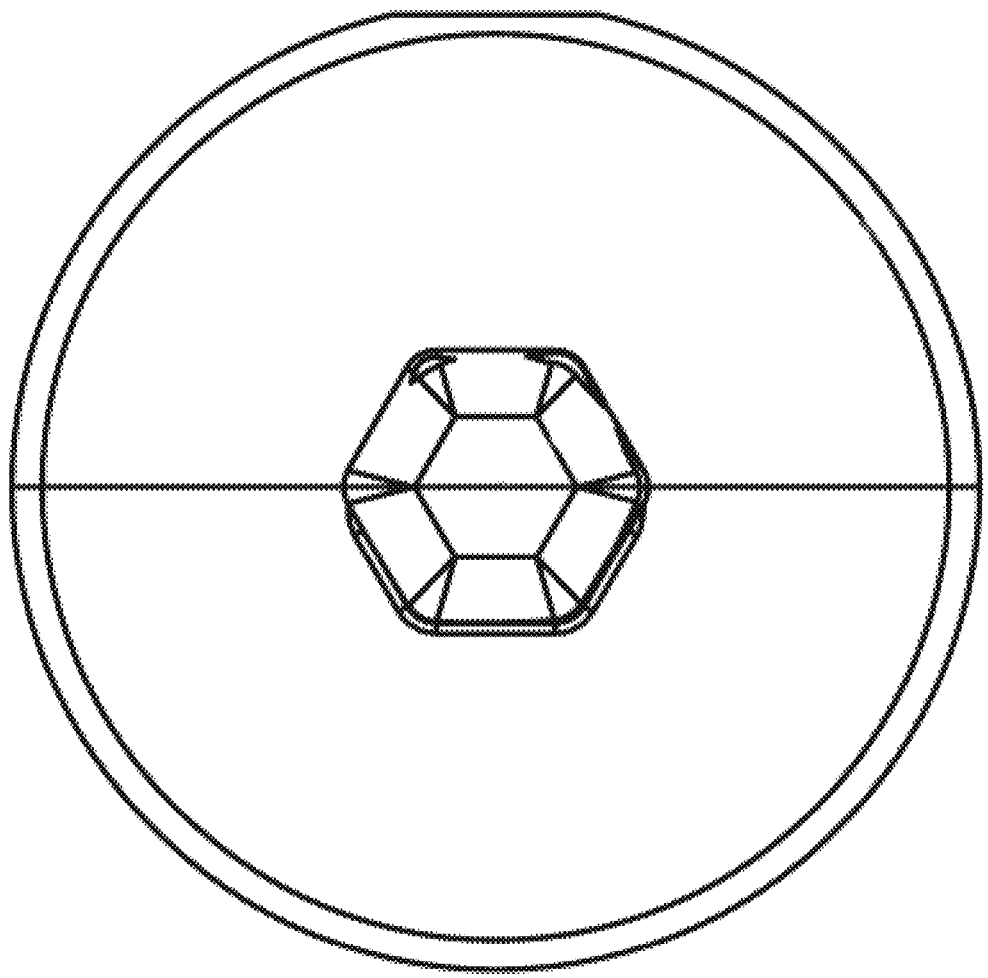
FIG. 10 is a top view of the negative standoff.
Figure 11:
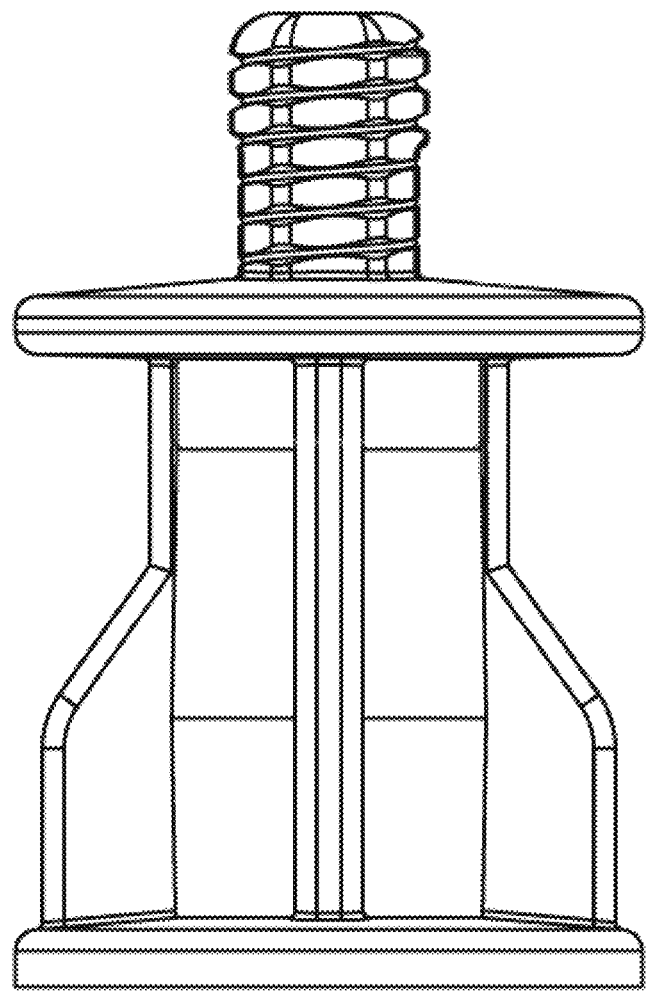
FIG. 11 is a front view of the negative standoff.
Figure 12:
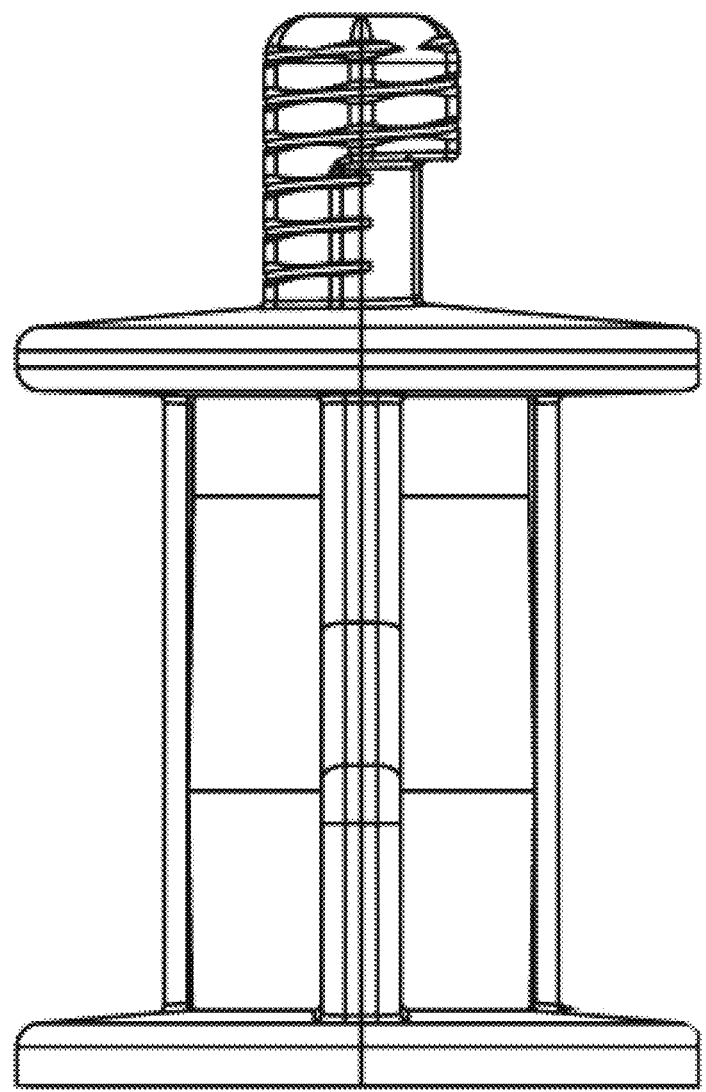
FIG. 12 is a right hand side view of the negative standoff.
Figure 13:
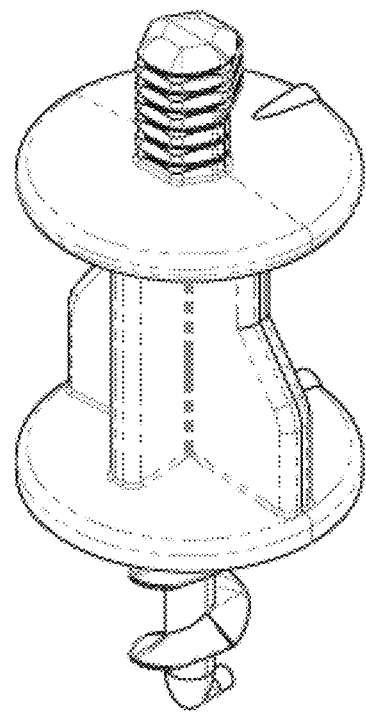
FIG. 13 is an isometric view of a threaded standoff.
Figure 14:
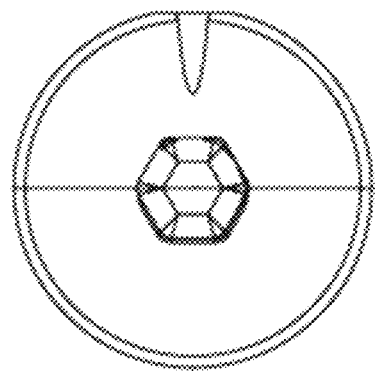
FIG. 14 is a top view of the threaded standoff.
Figure 15:
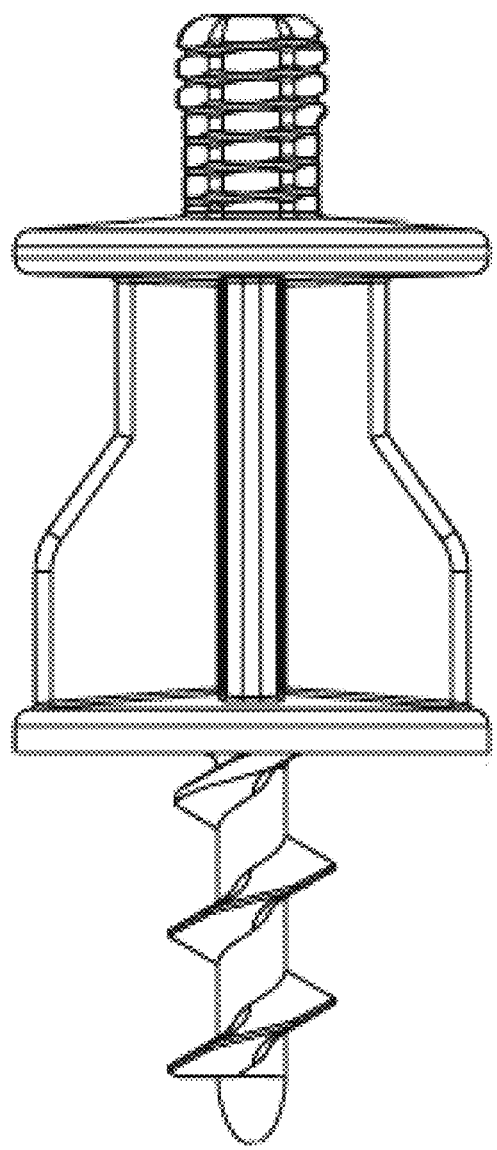
FIG. 15 is a front view of the threaded standoff.
Figure 16:
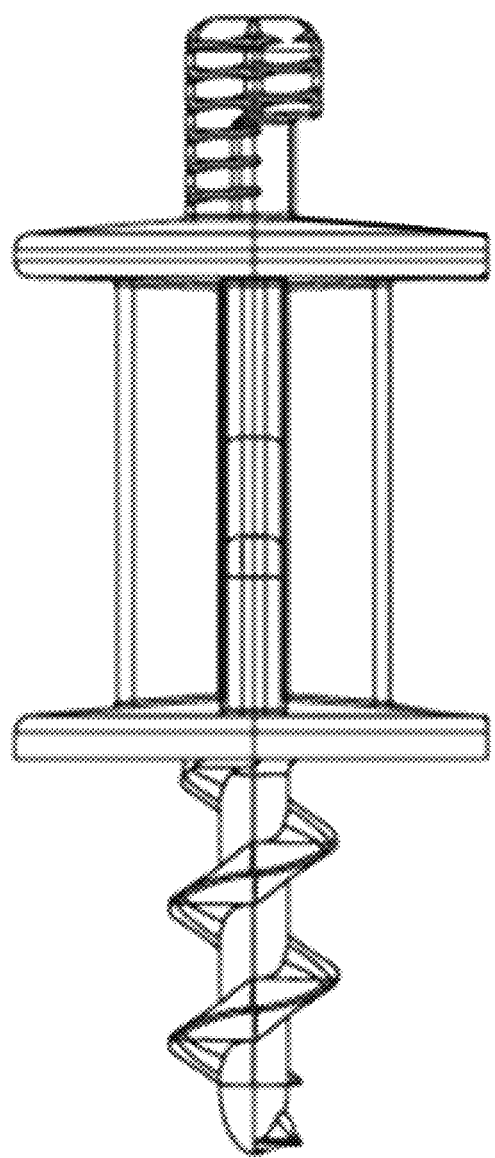
FIG. 16 is a right hand side view of the threaded standoff.
Figure 17:
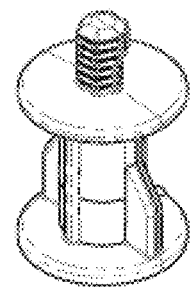
FIG. 17 is an isometric view of the standoffs.
Figure 17:
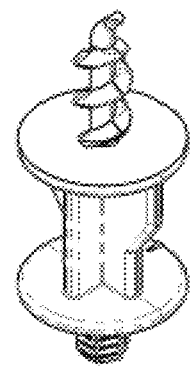
Figure 18:
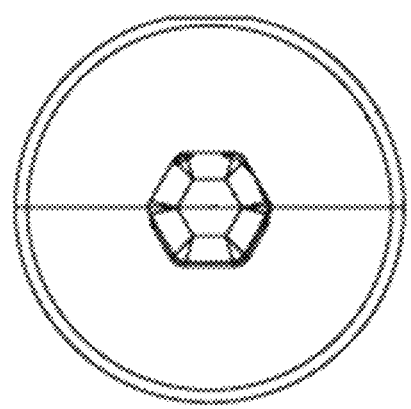
FIG. 18 is a top view of the standoffs.
Figure 19:
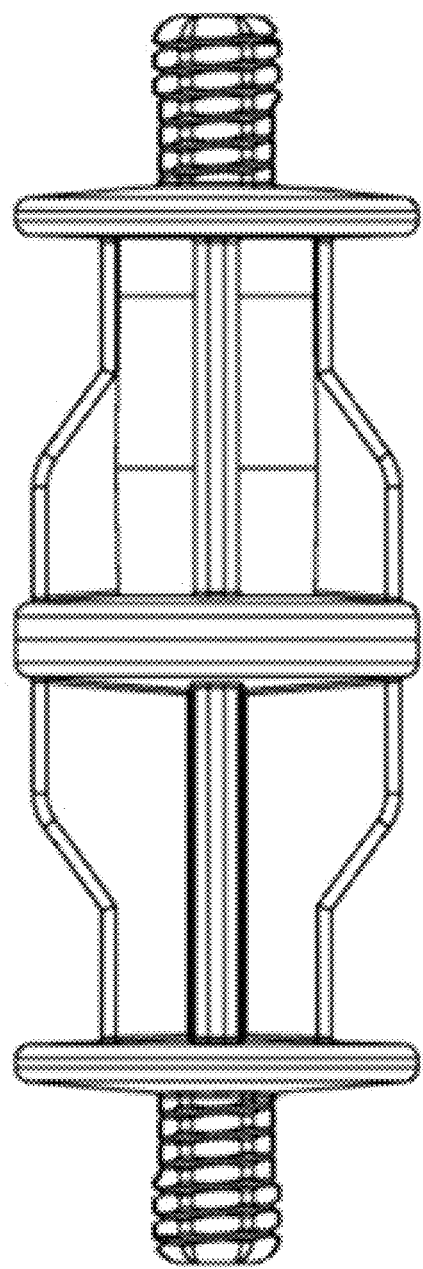
FIG. 19 is a front view of the front view of the standoffs joined together.
Figure 20:
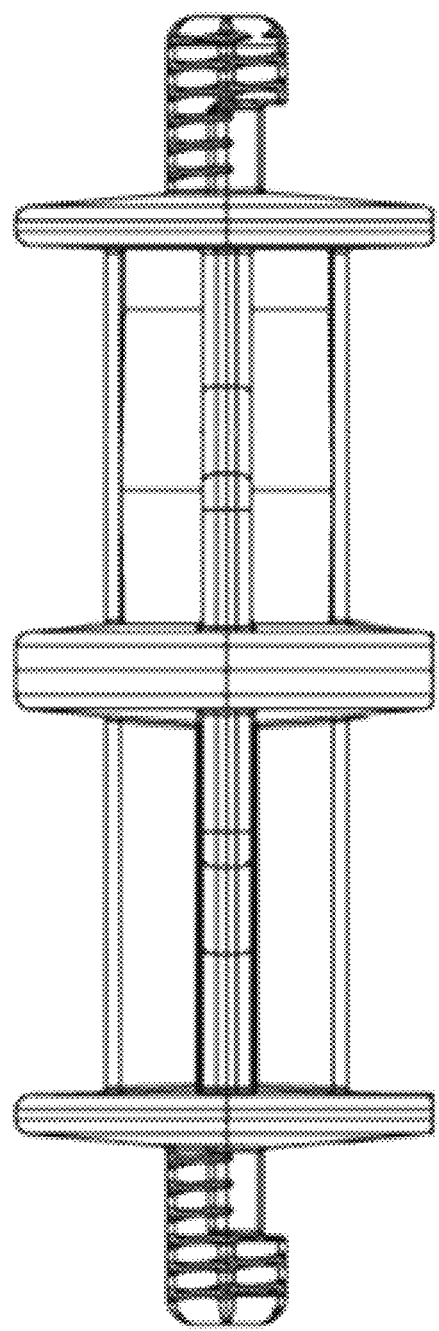
FIG. 20 is a right hand side view of the standoffs joined together.

FIG. 8 shows a screw 10 with an elongated body 46, that allows the head 12 of the screw to project away from the surface to which is attached to create dimensional effects or to mount items away from surface to which it is attached.

The screw 10 also includes a threaded top 42, with a notch 44, and a cap 40 that threads onto the top 42. The screw 10 shown in FIG. 8 provides additional structure to attach material to the head 12 of the screw.

The screw 10 and nut 12 can be made from multiple types of material include plastics, or metal.

The screw 10 is of various widths and lengths to accommodate, most preferably, different width and depth of holes in pegboard 26. Most preferably, the screw 10 is sized to accommodate ¼ inch pegboard. Of course, the screw 10 is not necessarily limited to use with pegboard 26, and the thread can be sized to be used with different sized holes.

In the foregoing manner the screw 10 substantially overcome the problems of the prior art by providing a devise that is designed for releasable but yet is a secure attachment to surfaces. Further, the screw 10 does not damage the hole into which it is inserted even though it uses a thread 16 that is wider than the hole, therefore avoiding the damage associated to surfaces associated with the prior art.

FIGS. 9-12 show a negative standoff adapted for use with the present invention. The standoff has a threaded hexagonal shaped head with a notch, a circular disc below the head, an elongate body below the circular head, and a circular base at the bottom.

The elongated body is generally circular, with a number of horizontal flanges toward the lower portion of the body extending radially outward from the circular center. The bottom of the negative standoff includes a center opening designed to receive thread of the type described above in reference to the screw 10.

FIGS. 13-16 show a threaded standoff. The standoff has a threaded hexagonal shaped head with a notch, a circular disc below the head, an elongate body below the circular head, and a circular base at the bottom. Below the bottom are threads described above in reference to the screw 10. The elongated body is generally circular, with a number of horizontal flanges toward the lower portion of the body extending radially outward from the circular center.

FIGS. 17-20 show the negative and threaded standoffs, and the cooperative engagement therebetween. The threads of the threaded standoff selectively engage with the hole in the bottom of the negative standoff to create a single structure. In this manner a unified structure can be created that has a threaded hex head on both sides. For example, if the standoffs are used with a pegboard display, the standoffs can be connected from opposite sides of the pegboard, joined together with the thread through a hole in the pegboard. This makes a threaded hex head available on both sides of the pegboard without the use of any intermediate structures. The standoffs can be easily separated as well, by unthreading the engagement.

Figure 21:
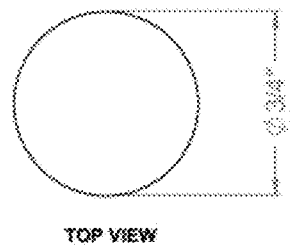
FIG. 21 shows top, isometric, front, right hand side, and bottom view of a nut cap.
Figure 21:
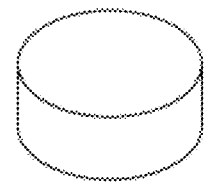
Figure 21:
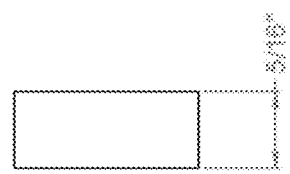
Figure 21:
Figure 21:
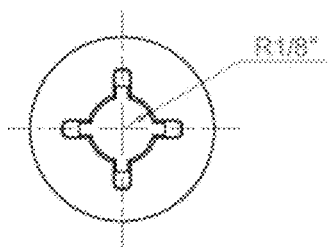

FIG. 21 shows a nut cap that can be used with the structures shown above. The cap is generally cylindrical in shape, and has an opening on the bottom. The bottom opening can be used to cover either a threaded hex head of one of the structures shown above (see FIGS. 8, 9, 13) or the thumb screw head (see FIGS. 2, 3).

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A fastener for insertion into a hole, comprising:
a head;
a stem depending from the head and having a longitudinal and a transverse axis;
a thread around the stem having a variable as measured along the transverse axis of the stem, where the thread has a variable width as measured along the longitudinal axis of the stem and where a first side of the thread has a constant curved radius, and an opposite second side has a variable radius comprised of a plurality of flat edges with a peak therebetween, and the thread has an upper and a lower sloped section that are staggered relative to each other and the upper and lower sloped sections and the flat edges are on the second side of the thread, and where the upper and lower sloped section are located completely above and below one of the plurality of flat sections, and where the upper and lower slope sections are staggered such that there is no overlap along the transverse axis between the two.

2. The fastener of claim 1 where the three flat sections with the upper and lower sloped sections above and below a middle of the three flat sections.

3. The fastener of claim 2 further comprising multiple threads.

4. The fastener of claim 1 where the head has a graspable flange.

5. The fastener of claim 1 where the head has threads.

6. The fastener of claim 5 where the head has a notch.

7. The fastener of claim 1 further comprising an elongated body between the head and stem.

8. The fastener of claim 1 further comprising a nut that threads onto the stem.

9. The fastener of claim 1 where the fastener clamps to the hole upon full insertion therein.

* * * * *